(12) United States Patent
Dotts, III

(10) Patent No.: US 8,517,669 B2
(45) Date of Patent: Aug. 27, 2013

(54) MECHANICAL WIND TURBINE AND METHOD OF USE

(76) Inventor: William Dotts, III, Marshalltown, IA (US)

( * ) Notice: Subject to any disclaimer, the term of this patent is extended or adjusted under 35 U.S.C. 154(b) by 690 days.

(21) Appl. No.: 12/837,592

(22) Filed: Jul. 16, 2010

(65) Prior Publication Data

US 2012/0013124 A1    Jan. 19, 2012

(51) Int. Cl.
*F01D 15/12* (2006.01)
*F01D 25/00* (2006.01)
*F03D 11/02* (2006.01)
*F04D 29/00* (2006.01)

(52) U.S. Cl.
USPC ..................... 415/122.1; 416/170 R

(58) Field of Classification Search
USPC ................ 415/122.1, 124.1, 124.2; 416/163, 416/162, 160, 170 R; 290/1 C, 55
See application file for complete search history.

(56) References Cited

U.S. PATENT DOCUMENTS

| | | | |
|---|---|---|---|
| 1,633,460 A | 6/1927 | Silvestrin | |
| 2,517,135 A | 8/1950 | Rudisill | |
| 2,539,862 A | 1/1951 | Rushing | |
| 3,942,026 A | 3/1976 | Carter | |
| 4,186,312 A | 1/1980 | Dvorak | |
| 4,433,544 A | 2/1984 | Wells et al. | |
| 4,613,760 A | 9/1986 | Law | |
| 7,250,691 B2 | 7/2007 | Enis et al. | |
| 7,436,085 B2 | 10/2008 | Shibata et al. | |
| 7,775,843 B1 * | 8/2010 | Vanderhye | 440/8 |
| 2002/0024222 A1 * | 2/2002 | Jang | 290/55 |
| 2003/0032343 A1 * | 2/2003 | Garcia | 440/8 |

* cited by examiner

*Primary Examiner* — Nathaniel Wiehe
*Assistant Examiner* — Su Htay
(74) *Attorney, Agent, or Firm* — McKee, Voorhees & Sease, P.L.C.

(57) ABSTRACT

A mechanical wind mill is provided for producing electricity through the power of wind energy. The wind turbine may include a plurality of gears which may be interchanged to control the rotational velocity of the wind turbine to most efficiently produce electricity. Including in the plurality of gears are the set of gears which may be slid along a shaft to best control the rotational velocity, but which may be changed as wind speed changes. The gears are mounted on a shaft, which is connected to a generator that is capable of producing electricity by rotation of said shaft.

18 Claims, 4 Drawing Sheets

MECHANICAL WIND TURBINE AND METHOD OF USE

FIELD OF THE INVENTION

The present invention relates generally to an improved wind turbine and method of use for generating electricity from wind. More particularly, but not exclusively, the invention relates to an adjustable speed wind turbine using mechanical components to adjust the rotational velocity of the turbine in response to wind speed so as to efficiently produce electricity from the wind.

BACKGROUND OF THE INVENTION

Wind energy has been used for many years to generate electricity. Windmills and turbines have been utilized to capture wind to convert the wind energy to electricity through the use of a generator. Generally, a plurality of blades is used to best harness the wind to rotate a shaft. A generator, connected either directly to the rotating shaft, or indirectly via a series of rotating and connected shafts, is used to convert the wind energy to electricity. The electricity can then either be directly used, or stored in batteries or some other storage means.

Problems exist in using wind power to turn turbines and windmills to generate electricity via generators. Wind strength depends on the difference in pressures. More specifically, wind on earth occurs due to the difference in temperatures between the equator and the poles, and the rotation of the planet. Because weather patterns may affect the difference of pressures, and thus, the strength of winds, the amount of rotation of the turbine and windmill blades will vary. In some instances, this variation could be great. One day may not have enough wind to turn the turbines at all, while the next may have too strong winds that cause the blades to rotate too fast, which could lead to damage to the devices. Problems exist in trying to deal with the varying strengths of wind.

In the past, people have used governors or differential drive units to try to control the rotational velocities of the turbines. The devices utilize a set of gears and an electrical switch for determining when the rotational velocity has become too great. Once the rotational velocity of the turbine blades are controlled, the switch is deactivated and the turbine runs as normal. However, this type of arrangement requires the use of several moving parts, and some needing electrical power of their own to operate. If any one of the parts fails or is damaged, the entire device must be shut down and rebuilt, which is costly and time consuming. In addition, devices only include ways to limit or slow down the rotational blade velocity, and do not include means to aid the turning of the turbines on days of low winds without using electricity themselves.

Newer turbines include complex computerized systems to control the rotational velocity of the turbine blades. During periods of high winds, most modern turbines contain a computerized shut-off switch to protect the long blades. The modern turbines require vast amounts of money to both build and maintain, however. Computerized systems are expensive to incorporate. If these systems fail or are damaged, the time, cost, and difficulty in replacing or fixing the computer systems may be more than the benefit derived from the wind turbine itself.

Therefore, the present invention addresses the problem of providing a speed controllable, electricity generating wind turbine which is cost-effective to maintain and that will be productive and efficient in a wide range of wind strengths.

SUMMARY OF THE INVENTION

It is therefore a primary object, feature, and/or advantage of the present invention to provide an improved method and apparatus for efficiently producing electricity using wind power.

It is another object, feature, and/or advantage of the present invention to provide an improved method and apparatus that is easily adjustable to account for different wind strengths.

It is another object, feature, and/or advantage of the present invention to provide an improved method and apparatus to generate electricity using wind energy that is inexpensive to maintain.

It is another object, feature, and/or advantage of the present invention to provide an improved method and apparatus that will generate electricity from wind energy during periods of high or low wind strength.

It is another object, feature, and/or advantage of the present invention to provide an improved method and apparatus that can quickly be adjusted to account for changing wind strengths and the corresponding rotational velocity of the turbine blades.

One or more of these and/or other objectives will become apparent from the following description of the invention. No single embodiment need exhibit each and every object, feature, or advantage.

According to one aspect of the present invention, an adjustable wind turbine for generating electricity is provided. The wind turbine includes a rotor assembly, first and second rotor gears, an output shaft, first and second output gears, a gear sliding element, and a generator. The rotor assembly includes a rotor shaft having a first and a second end, and a plurality of blades radially mounted on the first end. The first and second gears are mounted at the second end of the rotor shaft. The output shaft is generally perpendicular to the rotor shaft, configured to rotate, and has an upper end and a lower end. The first and second output gears are slidably mounted at the upper end of the output shaft. The first output gear is configured to selectively engage the first rotor gear, while the second output and rotor gears are disengaged and the second output gear is configured to selectively engage the second rotor gear while the first rotor and output gears are disengaged. The gear sliding element is operatively connected to the output shaft and configured to slide the output gears along the output shaft. The generator is operatively connected to the lower end of the output shaft and configured to generate electricity as the output shaft rotates.

According to another aspect of the present invention, an adjustable wind turbine for generating electricity is provided. The wind turbine includes a rotor assembly, first and second rotor gears, a transitional shaft, first, second, third, and fourth transitional gears, a sliding element, an output shaft, and first and second output gears. The rotor assembly includes a rotor shaft having a first and a second end, and a plurality of blades radially mounted on the first end. The first and second gears are mounted at the second end of the rotor shaft. The transitional shaft is generally perpendicular to the rotor shaft, is configured to rotate, and has an upper end and a lower end. The first and second transitional gears are slidably mounted at the upper end of the transitional shaft, with the first transitional gear configured to engage the first rotor gear and the second transitional gear configured to engage the second rotor gear. The third and fourth transitional gears are slidably mounted at the lower end of the transitional shaft. The sliding element is operatively connected to the transitional shaft and is configured to slide the transitional gears along the transitional shaft. The output shaft is operatively connected to the transitional shaft, configured to rotate, and is generally perpendicular to the transitional shaft. The first and second output gears are mounted at a first end of the output shaft, with the first output gear configured to engage the third transitional gear and the second output gear configured to engage the fourth transitional gear. Only one set of gears at the upper end and one set of gears at the lower end are engaged at any time.

According to yet another aspect of the present invention, a method of producing electricity from an adjustable speed wind turbine is provided. The method includes providing a mechanical wind turbine including a rotor shaft, a plurality of blades radially mounted on a first end of the rotor shaft, first and second rotor gears mounted on a second end of the rotor shaft, an output shaft having an upper and lower end, first and second output gears mounted at the upper end of the output shaft, a sliding element operatively connected to the output shaft surrounding the first and second output gears, and a generator operatively connected to the lower end of the output shaft. A wind speed is determined. A rotational velocity of the plurality of blades is determined. The sliding element is moved to a first position or a second position based on the wind speed and the rotational velocity, wherein the first rotor gear and the first output gear are engaged in the first position, or the second rotor gear is engaged with the second output gear in the second position to control the rotational velocity of the plurality of blades. The output shaft is rotated to generate electricity at the generator.

DETAILED DESCRIPTION OF THE PRESENT INVENTION

Figure 1A:
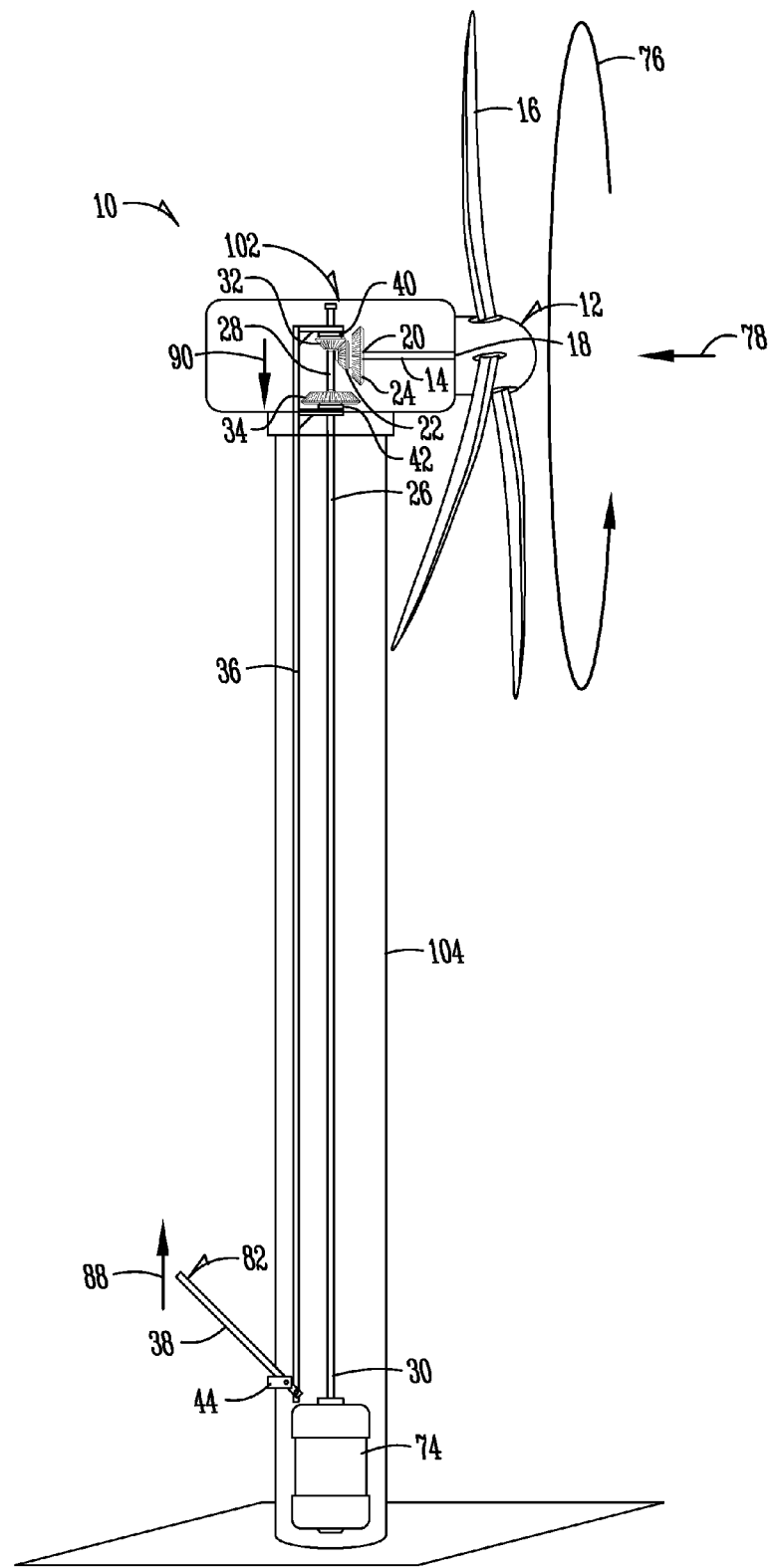
FIG. 1A is a partial sectional view of an adjustable wind turbine of the present invention with a lever arm and gears in a first position.

FIG. 1A is a partial sectional view of an adjustable speed wind turbine 10 of the present invention with a lever arm 38 and gears in a first position. The wind turbine 10 generally consists of a rotor assembly 12, a nacelle 102 and a tower 104. The rotor assembly 12 includes a rotor shaft 14, a plurality of blades 16 radially mounted on the rotor shaft 14 at a first end 18 of the rotor shaft, and first and second gears 22, 24 mounted at a second end 20 of the rotor shaft. The blades 16 are sized and designed to best capture an incoming wind 78 and are positioned outside of the nacelle 102. The rest of the rotor assembly, including the shaft and gears, is generally disposed within the nacelle 102, which keeps the moving parts from being exposed to environmental conditions that could adversely affect or damage the equipment.

The first and second gears 22, 24 are bevel gears. While the first and second gears are shown as bevel gears, it should be appreciated that they may be other types of gears, such as worm gears, spur gears, helical gears, or the like. The location and size of the first and second gears 22, 24 may be determined by the type of gear chosen. Preferably, the first gear 22 is on the rear end of the rotor shaft 14. Directly adjacent the first gear 22 is a second rotor gear 24. The second rotor gear 24 is generally larger in diameter than the first rotor gear 22. The first and second gears 22, 24 rotate at the speed of the rotor shaft 14, and are generally fixed in position. The rotor assembly 12 will rotate at a rotational velocity 76 which is dependent on the wind speed 78 as well as internal combinations of gears, as will be discussed in greater detail below.

Extending generally perpendicular to the rotor shaft 14 and being disposed within the nacelle 102 and tower 104 is a rotatable output shaft 26. The output shaft 26 extends from an upper end 28 at the top of the nacelle 102 and down to a lower end 30 which is connected to a generator 74. The rotation of the output shaft 26 drives the generator 74 to create electricity.

To convert the rotation of the rotor assembly 12 to rotate the output shaft 26, a first and second output gear 32, 34 is provided. The first output gear 32 is generally a bevel gear and is sized similar to the first rotor gear 22, such that the first rotor gear 22 and the first output gear 32 are able to engage with one another to transfer power from the rotor shaft 14 to the output shaft 26. The second output gear 34 is also a bevel gear and is sized larger than the first output gear 32. The second output gear 34 is sized to communicate and be operatively connected to the second rotor gear 24 to transfer power from the rotor shaft 14 to the output shaft 26. It should be appreciated that if the first and/or second rotor gears are a type of gear besides a bevel gear, the first and second output gears will be of a similar type to operate to transfer rotation from the rotor shaft to the output shaft. The output shaft 26 is generally a splined shaft upon which the first and second output gears 32, 34 are able to slide along. The splines of the output shaft 26 coincide with the centers of the first and second output gears 32, 34 to slide the gears along the shaft. In addition, the shaft 26 may be square in cross-sectional shape, or it may be round. To slide the first and second output gears 32, 34 along the output shaft 26, a gear sliding element 36 is provided. The gear sliding element 36 includes a pair of arms 62 that surround the gears at the output shaft 26. Adjacent the arms and positioned between the arms 62 and the gears are a first and second ball bearing unit 40, 42. The ball bearing units are able to rotate about the output shaft 26 to reduce friction between the rotating gear and the arms 62. However, the first and second output gears 32, 34 should be operatively connected to the arms 62 such that the gears will slide with the arms.

At a lower end of the gear sliding element 36 is a lever arm 38 operatively connected to gear sliding element 36. The lever arm works to be manually moved between a first and second raised and lowered position 82, 84, respectively, which coincides with a movement of the first and second output gears 32, 34. FIG. 1A shows the lever arm in a first position 82. The lever arm has been placed in this position after being moved in the direction of arrow 88 of FIG. 1. In the first position, the first rotor gear 22 will be operatively connected to the first output gear 32. The second rotor 24 and the second output gear 34 will spin freely with the shafts, but are not be engaged with or operatively connected with each other.

As shown in FIG. 1A, the first rotor gear 22 and first output gear 32 are smaller than the second rotor gear 24 and second output gear 34. The smaller gears require less force to rotate and to transfer energy from the rotor gear to the output gear. Therefore, the windmill will be placed with the lever arm in the first position when wind speed 78 is low. The lower wind speed 78 will be enough to rotate the rotor shaft 14, which will cause the first rotor gear 22 to rotate the first output gear 32. The rotation of the first output gear 32 rotates the output shaft 26, which is connected to a generator 74 at a lower end. The generator 74 creates electricity that can either be stored in batteries (not shown), or be directly used by some sort of motor or other device.

For example, the power may be used to run a blower or underground fan. On days of extremely low wind, the blower or fan (not shown) may be used to run the generator 74 to continue to produce electricity. Because the wind speed 78 is low, the blades 16 would not rotate enough to produce electricity. However, the stored energy would be able to run the fan or blower, which would run the generator 74 to continue to produce electricity. As the blower or fan is run on stored electricity, the output would result in a net gain of electricity.

Figure 1B:
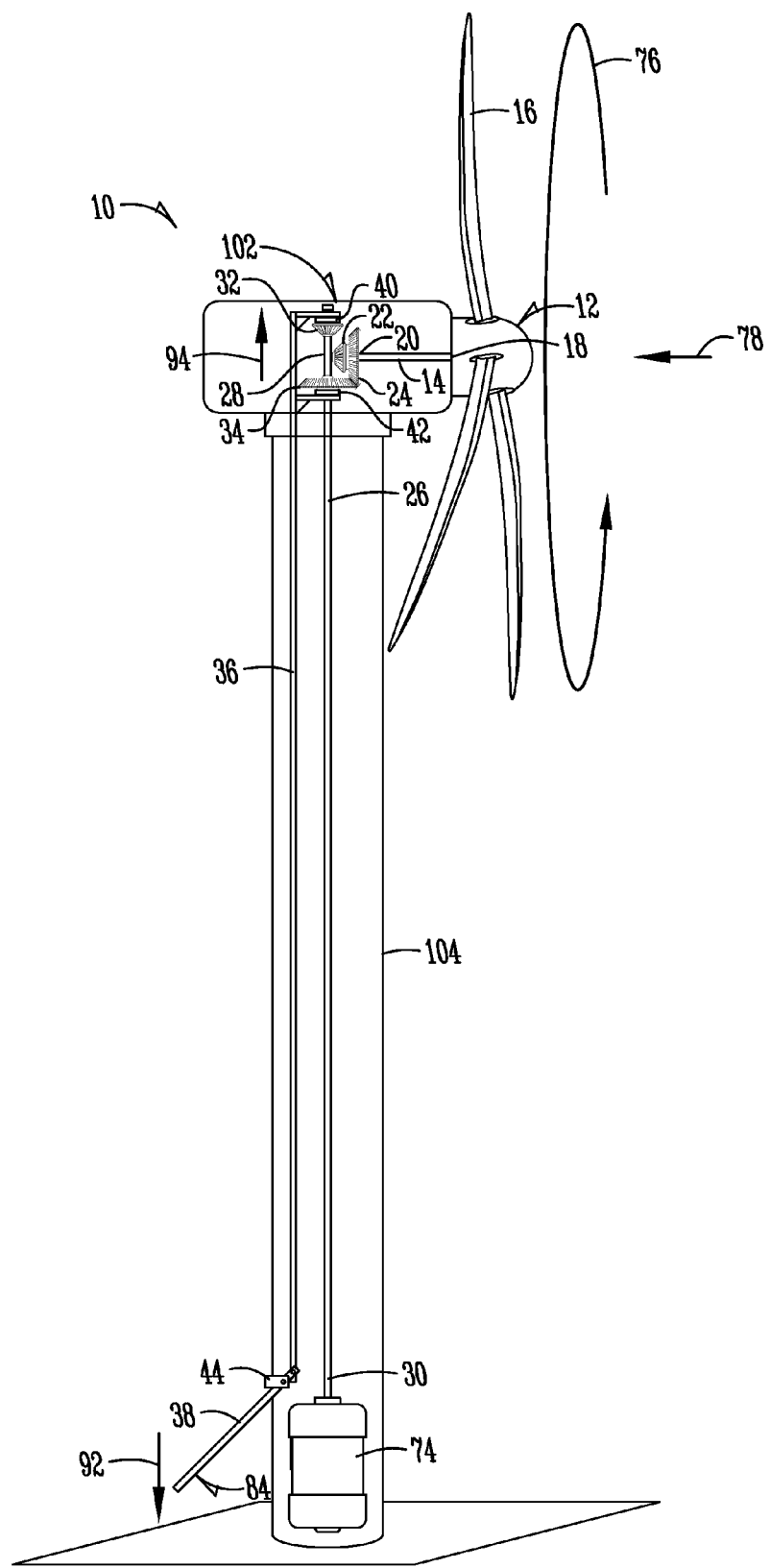
FIG. 1B is a view similar to FIG. 1A with the lever arm and gears in a second position.

FIG. 1B is a view of the windmill 10 of FIG. 1A with the lever arm 38 and gears in a second position 84. In this second position 84, the second rotor gear 24 will be operatively connected to the second output gear 34. The wind speed 78 will cause the blades 16 to rotate at a rotational velocity 76, which causes the rotor shaft 14 to rotate. This rotation causes the second rotor gear 24 to rotate at the same rotational speed 76. Because the second rotor gear 24 is operatively connected to the second output gear 34 in this position, the second output gear will rotate at a speed similar to the rotational speed of the second rotor gear 24. The second output gear 34 is operatively connected to the output shaft 26, which, as noted above, may be a spline shaft. The second output gear 34 is mounted on said shaft 26 at a fixed position and held in place by arms 62 of the sliding element 36. Between the second output shaft 34 and the arms 62 of the sliding element 36 is second ball bearing 42. The ball bearing 42 allows the gear 34 to rotate relative to the arms 62 without causing excess energy, including heat, which would be from the friction of the gear 34 and the arms 62. The power transferred between the second rotor gear 24 and the second output gear 34 is further transferred to the output shaft 26, which is operatively connected to a generator 74 at the lower end 30 of the shaft 26. The rotation of the shaft at the generator causes the generator to create electricity. To lock the gear sliding element 36 in the second position 84, a locking element 44 is also provided. The locking element ensures that the gears remain engaged and operatively connected and prevents them from slipping out, which would create problems. The locking element 44 may be as simple as a nut and bolt combination, an electronic lock, or the like.

As shown in FIG. 1B, the second rotor gear 24 and second output gear 34 are larger than the first gears. The larger gears have more teeth and a larger diameter, which can slow down the rotational velocity 76 of the blades 16 of the wind turbine 10. This will be useful in periods when the wind speed 78 is higher. On days of high wind speed, the assembly is moved into the second position 84, which slows down the rotational velocity 76 of the blades 16, to ensure that the internal components of the wind turbine 10 are not damaged, and also so that the generator produces energy at a safe output level.

The lever arm 38 may be moved between the first and second positions in a number of ways. In a preferred embodiment, the lever arm 38 is able to be manually moved between the first and second positions. However, a hydraulic or electric cylinder (not shown) or other means may also be used to move the lever arm 38. The electric cylinder could be powered by the electricity produced by the wind mill 10. Additionally, a cylinder may be positioned within the tower 104 to raise and lower the gear sliding element 36.

Figure 2:
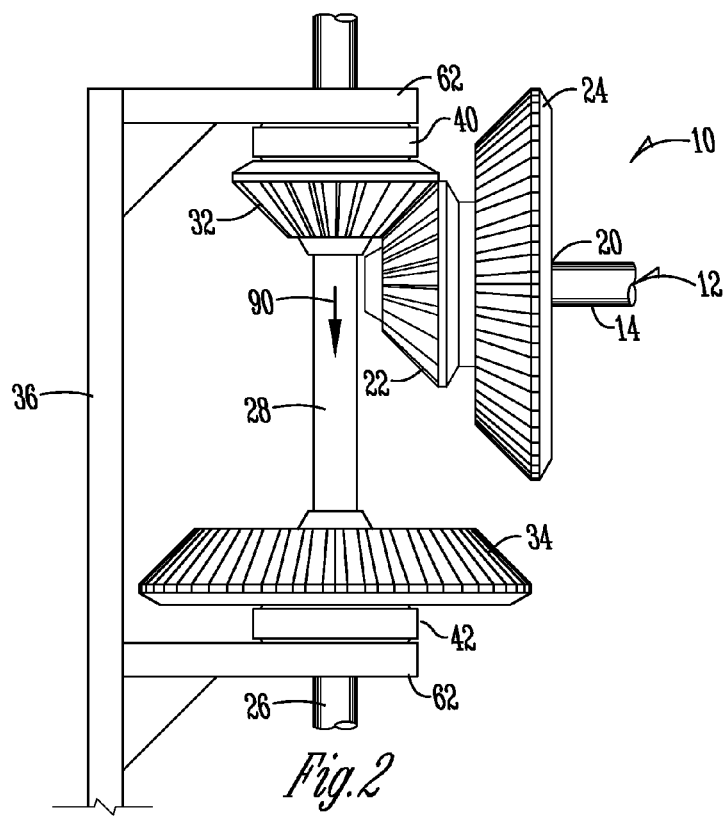
FIG. 2 is an enlarged view of the rotor and output gears of the wind turbine of FIG. 1A when the lever arm is in the first position.

FIG. 2 is an enlarged view of the rotor and output gears of the wind turbine 10 of FIG. 1A when the lever arm 38 is in the first position 82. As shown in FIG. 2, the first rotor gear 22 is operatively engaged with the first output gear 32. The rotation of the rotor shaft 14 will rotate the first rotor gear 22, which transfers the rotational energy to the first output gear 32 and corresponding output shaft 26. As also shown in FIG. 2, between the top arm 62 of the gear sliding element 36 and the first rotor gear 32 is a first ball bearing element 40. The ball bearing element allows rotation between the first output gear 32 and the arm 62 with reduced friction, which could increase wear and tear on both the gears and the arms of the wind turbine 10. As also shown in FIG. 2, an arrow 90 shows the direction that the gear sliding element is being moved and held in place when in the first position 82. This downward direction 90 ensures that the first rotor and output gears 22, 32 will remain operably engaged during periods of lower wind speed.

Figure 3:
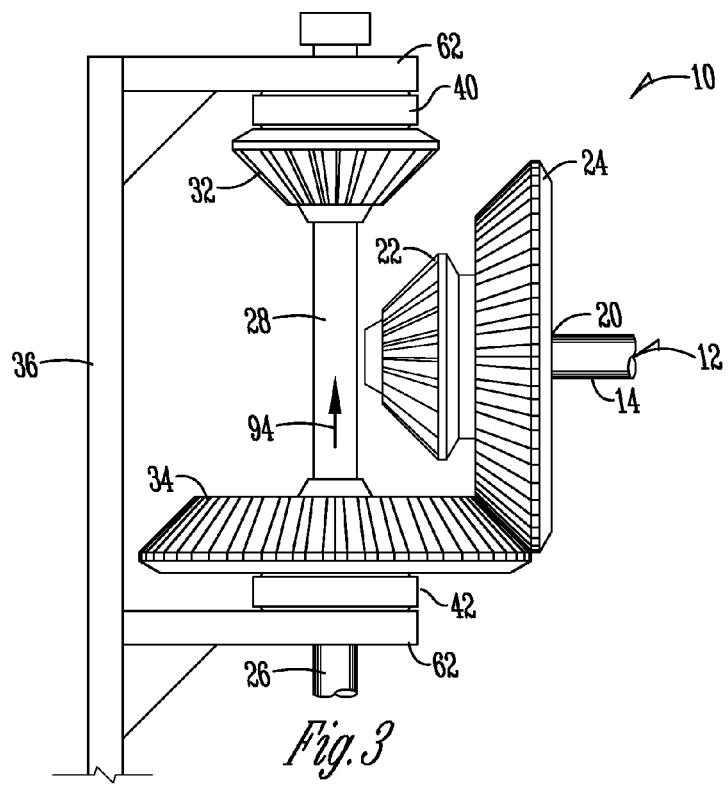
FIG. 3 is an enlarged view of the rotor and output gears of the wind turbine of FIG. 1B when the lever arm is in the second position.

FIG. 3 is an enlarged view of the rotor and output gears of the wind turbine 10 of FIG. 1B when the lever arm 38 is in the second position 84. In this position, the second rotor gear 24 is operatively engaged with the second output gear 34. The rotational speed of rotor shaft 14 is transferred to the first rotor gear 24, which transfers the rotational energy to the second output gear 34. This rotation of the second output gear 34 causes the output shaft 26 to rotate, thus creating electricity in the generator 74. Also as shown in FIG. 3, a second ball bearing element 42 is positioned between the lower arm 62 of the gear sliding element 36 and the second output gear 34. The second ball bearing element 42 reduces friction between the second output gear 34 and the arm 62, which reduces wear and tear on the elements of the wind turbine 10. As discussed above, the second rotor gear and output gear 24, 34 will be operatively engaged in periods of higher wind to lower the rotational velocity 76 of the blades 16 to ensure a safe speed for producing electricity at the generator 74. The arrow 94 shows the direction that the gear sliding element is moved in the second position (discuss arrow 94 of FIG. 3).

Figure 4:
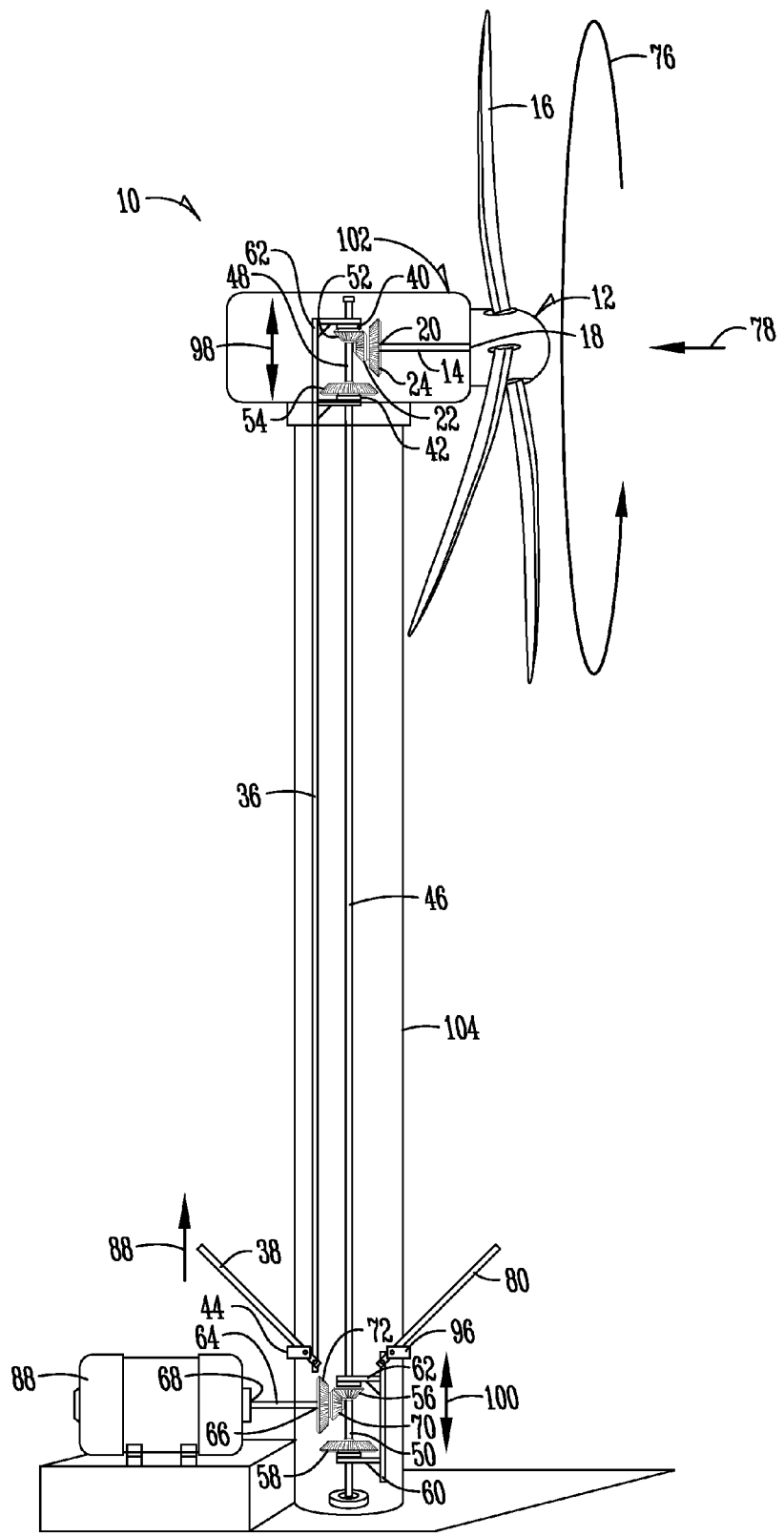
FIG. 4 is a partial sectional view of another embodiment of an adjustable wind turbine of the present invention having more speed and gear selections to control the rotational velocity of the turbine blades.

FIG. 4 is a partial sectional view of another embodiment of an adjustable wind turbine 10 of the present invention having more speed and gear selections to control the rotational velocity 76 of the turbine blades 16. In this embodiment, the same reference numerals are used to designate the same structure as the first embodiment, including the wind turbine rotor assembly 12, the rotor shaft 14, the plurality of blades 16 radially mounted on the rotor shaft and adapted to rotate the rotor shaft 14 due to wind speed 78, the first rotor gear 22, and the second rotor gear 24. The first and second rotor gears 22, 24 are rotatably mounted on the rotor shaft 14 at a second end of the rotor shaft such that the rotation of the rotor shaft due to the rotation of the blades 16 will rotate the gears as well.

Generally perpendicular to the rotor shaft 14 and disposed within the nacelle 102 and the tower 104 is a transitional shaft 46. At an upper end 48 of the transitional shaft 46 is a first transitional gear 52 rotatably connected to the rotational shaft and a second transitional gear 54 also rotatably connected to the transitional shaft 46. The first transitional gear 52 is configured to be operatively engaged with the first rotor gear 22, and the second transitional gear 54 is configured to be operatively engaged with the second rotor gear 24. The first and second transitional gears 52, 54 are mounted on a gear sliding element 36 by a plurality of arms 62, and are moveable along the transitional shaft 46 as shown by the arrow 98 to engage the first or second rotor gears depending on the wind speed 78. The transitional shaft 46 is be fixed in position and may be splined, such that the gears are able to slide along the splines as determined by a lever arm 38 and held in place by a locking mechanism 44. As shown in FIG. 4, the lever arm has moved in the direction of the arrow 88 such that the first rotor gear 22 is operatively engaged with the first transitional gear 52. This combination is used in periods of lower wind speed 78 to increase the rotational velocity 76 of the wind turbine blades 16. However, in periods of higher wind speed 78 the second rotor gear and second output gear 24, 54 may be engaged to further control the rotational velocity 76 of the wind turbine blades 16.

At a lower end 50 of the transitional shaft 46 is mounted a third transitional gear 56 and a fourth transitional gear 58. The third and fourth transitional gears 56, 58 are mounted on the shaft and held in place by a second gear sliding element 60, which includes arms 62 extending therefrom. The third and fourth transitional gears 56, 58 are configured to be slid along the transitional shaft 46 by the gear sliding element 60 according to the position of the second lever arm 80. As shown by arrow 100, the gear sliding element can move up and down along the transitional shaft and locked in place by a second locking mechanism 96.

Positioned at the lower end 50 of the transitional shaft and generally perpendicular thereto is an output shaft 64. At a first end 66 of the output shaft 64 is rotatably mounted a first output gear 70 and a second output gear 72. The first output gear 70 is configured to be rotatably engaged with the third transitional gear 56, and the second output gear 72 is configured to be rotatably engaged with the fourth transitional gear 58. At a second end 68 of the output shaft 64 is a generator 88 for producing electricity.

The second embodiment of FIG. 4 shows a wind turbine 10 that can have four different speed control configurations depending on which gear combinations are operatively engaged. For example, as shown in FIG. 4, the first rotor gear 22 is rotatably engaged with the first transitional gear 52 at an upper end, and the third transitional gear 56 is rotatably connected with the first output gear 70. The gear sliding elements 36, 60 are locked in place by locking mechanisms 44, 86 such that these gears will be locked in position along their respective shafts. This combination would be used when the wind speed 78 is extremely low. The low speed combination will not take much wind speed to produce enough rotational velocity 76 of the wind turbine blades 16 to create an output rotation of the output shaft 64 to create electricity at the generator 88. However in times of higher wind speeds, the larger gears, such as the second rotor gear 24 and the second transitional gear 54, and the gears 58, 72, may be slid into engagement to slow the rotation of the output shaft 64. At higher wind speed 78 the slower rotation would be needed so as to not damage the components of the wind turbine 10. As a further alternative, the upper small gears 22, 52 may be used with the lower large gears 58, 72, or the upper large gears 24, 54 may be used with the lower small gears 56, 70, to get the desired blade speed.

These combinations of the gears at the upper end of the transitional shaft and at the lower end of the transitional shaft may be utilized to produce a desired rotation velocity blades 16 that will correspond with a most efficient rotational velocity of the output shaft to most efficiently create electricity at the generator.

The invention has been shown and described above with reference to preferred embodiments, and it is understood that modifications, substitutions, and additions may be made which are within the intended spirit of the above invention. The invention is only to be limited by claims appended hereto.

What is claimed is:

1. An adjustable wind turbine for generating electricity, comprising:
    a rotor assembly comprising a rotor shaft and a plurality of blades radially mounted on a first end of the rotor shaft;
    first and second rotor gears mounted at a second end of the rotor shaft;
    a rotatable output shaft generally perpendicular to the rotor shaft, the output shaft having an upper end and a lower end;
    first and second output gears slidably mounted at the upper end of the output shaft, the first output gear selectively engaging the first rotor gear and the second output gear selectively engaging the second rotor gear;
    a gear sliding element operatively connected to the output shaft to slide the first and second output gears along the output shaft; and
    a generator operatively connected to the lower end of the output shaft to generate electricity as the output shaft rotates.

2. The wind turbine of claim 1 wherein when the first rotor gear and the first output gear are engaged, the second rotor gear and the second output gear are disengaged.

3. The wind turbine of claim 2 further comprising a lever arm operatively connected to the gear sliding element and moveable between a first position where the first output gear is engaged with the first rotor gear, and a second position where the second output gear is engaged with the second rotor gear.

4. The wind turbine of claim 3 wherein the lever arm is manually moved between the first position to the second position.

5. The wind turbine of claim 4 further comprising a first ball bearing element mounted on the output shaft between the first output gear and the sliding element and a second ball bearing element mounted on the output shaft between the second output gear and the sliding element.

6. An adjustable wind turbine for generating electricity, comprising:
    a rotor shaft;
    a plurality of blades mounted on a first end of the rotor shaft;
    first and second rotor gears mounted at a second end of the rotor shaft;
    a rotatable transitional shaft generally perpendicular to the rotor shaft and having upper and lower ends;
    first and second transitional gears slidably mounted at the upper end of the transitional shaft, the first transitional gear adapted to engage the first rotor gear and the second transitional gear adapted to engage the second rotor gear;
    third and fourth transitional gears slidably mounted at the lower end of the transitional shaft;
    a sliding element operatively connected to the first, second, third and fourth transitional shaft to slide the transitional gears along the transitional shaft;
    a rotatable output shaft operatively connected to the transitional shaft, the output shaft generally perpendicular to the transitional shaft; and
    first and second output gears mounted at a first end of the output shaft, the first output gear adapted to engage the third transitional gear and the second output gear adapted to engage the fourth transitional gear.

7. The wind turbine of claim 6 further comprising a first lever arm operatively connected to the sliding element having a first position in which the first rotor gear engages the first transitional gear, and a second position in which the second rotor gear engages the second transitional gear.

8. The wind turbine of claim 7 wherein when a second lever arm is in the first position, the third transitional gear engages the first output gear, and when the lever arm is in the second position the fourth transitional gear engages the second output gear.

9. The wind turbine of claim 6 wherein when the first transitional gear is engaged to the first rotor gear, the second transitional gear is disengaged from the second rotor gear.

10. The wind turbine of claim 6 further comprising a generator operatively connected to a second end of the output shaft.

11. The wind turbine of claim 6 wherein the sliding element includes a plurality of arms that surround the first, second, third and fourth transitional gears.

12. The wind turbine of claim 11 comprising a plurality of ball bearing units adjacent the plurality of arms of the sliding element to rotate due to the rotation of the first, second, third and fourth transitional gears.

13. The wind turbine of claim 6 further comprising a locking mechanism to maintain the sliding element in a first or second position.

14. A method of producing electricity from an adjustable speed wind turbine, comprising:
- providing a mechanical wind turbine including a rotor shaft, a plurality of blades extending radially from a first end of the rotor shaft, first and second rotor gears mounted on a second end of the rotor shaft, an output shaft having an upper and lower end, first and second output gears mounted at the upper end of the output shaft, a sliding element operatively connected to the output shaft surrounding the first and second output gears, and a generator operatively connected to the lower end of the output shaft;
- selectively moving the sliding element between a first position and a second position based on wind speed and the rotational velocity of the blades;
- wherein the first rotor gear and the first output gear are engaged in the first position, and the second rotor gear is engaged with the second output gear in the second position to control the rotational velocity of the plurality of blades; and
- rotating the output shaft to generate electricity at the generator.

15. The method of claim 14 wherein the first rotor gear is engaged with the first output gear when there is low wind speed.

16. The method of claim 14 wherein the second rotor gear is engaged with the second output gear when there is higher wind speed.

17. The method of claim 14 further comprising locking the sliding element in place at the selected first or second position.

18. The method of claim 14 further comprising determining the rotational velocity of the blades due to the wind speed.

* * * * *